United States Patent [19]

Amir

[11] Patent Number: 5,101,442

[45] Date of Patent: Mar. 31, 1992

[54] THREE-DIMENSIONAL IMAGING TECHNIQUE USING SHARP GRADIENT OF ILLUMINATION

[75] Inventor: Israel Amir, Ewing, N.J.

[73] Assignee: AT&T Bell Laboratories, Murray Hill, N.J.

[21] Appl. No.: 440,948

[22] Filed: Nov. 24, 1989

[51] Int. Cl.$^5$ .............................................. G06K 9/00
[52] U.S. Cl. ...................................... 382/41; 382/8; 382/62; 358/88; 356/12
[58] Field of Search ................... 382/1, 8, 28, 42, 45, 382/58; 356/360, 12; 364/474.05, 474.36, 460, 458; 358/88, 107, 101, 106; 250/563

[56] References Cited

U.S. PATENT DOCUMENTS

| | | | |
|---|---|---|---|
| 4,113,389 | 9/1978 | Kaye | 356/164 |
| 4,647,208 | 3/1987 | Bieman | 356/357 |
| 4,653,104 | 3/1987 | Tamura | 382/42 |
| 4,677,473 | 6/1987 | Okamoto et al. | 358/101 |
| 4,731,853 | 3/1988 | Hata et al. | 382/1 |
| 4,731,860 | 3/1988 | Wahl | 382/41 |
| 4,767,212 | 8/1988 | Kitahashi et al. | 356/379 |
| 4,811,410 | 3/1989 | Amir et al. | 382/8 |
| 4,849,645 | 7/1989 | Mendenko et al. | 250/563 |

OTHER PUBLICATIONS

B. Carrihill and R. Hummel, "Experiments with the Intensity Ratio Depth Sensor", *Computer Vision, Graphics, and Image Processing*, 32, 337-358 (1985).

*Primary Examiner*—David K. Moore
*Assistant Examiner*—Yon Jung
*Attorney, Agent, or Firm*—Robert B. Levy

[57] ABSTRACT

A three-dimensional image of a substrate (10) is obtained by separately spanning the substrate with each of two lines of light (30,32), directed at the substrate surface (12) at the same angle but offset from each other, to illuminate a separate one of a pair of strips (34,36). A linescan camera (38) is trained on the substrate surface (12) to sense the intensity of the light reflected from a strip (40) lying between the strips (34,36) separately illuminated by the lines of light (30,32). The height (or depth) of each attribute (e.g. a component 17) lying in the strip may be obtained in accordance with a prescribed relationship between the sensed reflectance intensity attributed to each of the lines of light (30,32). A slide (50) is provided for displacing the substrate (10) relative to the linescan camera (38) and the two lines of light (30 and 32) to enable the height of the attributes in each of a plurality of contiguous strips of area on the surface (12) to be established, allowing a three-dimensional image to be obtained.

12 Claims, 2 Drawing Sheets

THREE-DIMENSIONAL IMAGING TECHNIQUE USING SHARP GRADIENT OF ILLUMINATION

TECHNICAL FIELD

This invention relates to a method and apparatus for obtaining a three-dimensional image of a substrate in accordance with the gradient of the illumination reflected from its surface.

BACKGROUND OF THE INVENTION

Within the electronics industry, there is a trend towards automated inspection of a circuit board following placement of components on it to detect if any of the components have been improperly placed or are missing. Further, efforts are now underway to inspect the circuit board before component placement but immediately after application of a layer of solder paste, which is applied to bond the components, to detect if the paste has been properly applied. By inspecting the circuit board at each stage of its fabrication, the board can be repaired to correct such defects more economically. For example, if the solder paste has been applied improperly, it is far easier, and hence less expensive, to clean the board and reapply paste to it prior to placement of the components rather than afterwards. Similarly, missing and misplaced components can be corrected more easily if such defects are detected prior to reflow of the solder paste to solder bond the components to the circuit board rather than after reflow of the paste.

In U.S. Pat. No. 4,811,410, issued on Mar. 7, 1989, in the name of I. Amir et al. and assigned to AT&T (incorporated by reference herein), there is disclosed a technique for inspecting a circuit board by directing a beam of light at the board along a first angular direction. The intensity of the light reflected from the circuit board along a second angular direction is sensed by a linescan-type camera. This type of camera is characterized by a plurality of light-sensing elements arranged in a linear array so that each element of the camera senses the light intensity from a separate one of a plurality of small regions which collectively comprise a thin strip of surface area running across the board surface. A relative motion is imparted between the circuit board and linescan camera so the camera captures the image of successive strips of area on the circuit board. The output signal of the linescan camera is then processed to retain only the image of those regions of interest in each strip which is then subsequently processed to detect if defects, such as missing and misplaced components, are present.

The linescan inspection system disclosed in the Amir et al. patent (incorporated by reference herein) has proven useful for pre-solder inspection of circuit boards containing through-hole components (i.e., components with leads designed for insertion through openings in the board). The Amir et al. system, especially when operated in the manner taught in U.S. Pat. No. 4,929,845, issued on May 29, 1990, in the name of I. Amir et al. and assigned to AT&T (herein incorporated by reference), has also proven useful for inspecting circuit boards containing surface mount components. Surface mount components differ from their through-hole counterparts in that surface mount components have conductive members (i.e., leads or pads) designed for solder bonding to metallized areas on the surface of the circuit board. Unlike through-hole components, which are commonly wave soldered to the circuit board, surface mount components are solder bonded to the board by a different process. First, solder paste is applied to the metallized areas on the circuit board and then the conductive members of each the component are placed on the paste-coated areas. After component placement, the solder paste is reflowed to bond the conductive members of the component to the circuit board.

While the Amir et al. linescan inspection system can accomplish pre-solder inspection of circuit boards containing surface mount components, the results are usually less accurate than with circuit boards carrying through-hole components. One reason is that the solder paste applied to the metallized areas on the circuit board tends to be reflective, although much less so than the leads on a leaded surface mount component. In the absence of a component lead, the solder paste thus reflects light into the linescan camera, causing the linescan camera to mistake the paste for a component lead. Errors caused by such spurious light reflection could be eliminated if the presence and nominal location of the components were known from a three-dimensional image of the circuit board. Having a three-dimensional image of the circuit board would also greatly facilitate inspection of circuit board immediately after application of solder paste to determine if the proper volume of paste was applied. Post-solder inspection would also be aided by having a three-dimensional image of the circuit board as well.

In my U.S. Pat. No. 4,965,665, issued on Oct. 23, 1990, and assigned to the same assignee, a technique is disclosed for obtaining a three-dimensional image of a substrate using a linescan camera. The camera is trained on the substrate normal to its surface to sense the intensity of light reflected from a thin strip of area running across the substrate surface along a first axis. A line of light, parallel to the first axis, is spanned or swept across a small region of the surface of the substrate in a direction perpendicular to the first axis to successively illuminate each of a plurality of strips of area lying in a band which includes the strip imaged by the camera. The linescan camera is synchronized to successively capture the image of the strip within its field of view each time a successive one of the strips in the band is spanned by the line of light. The successive images of the strip within the field of view of the camera are processed to establish the height (or depth) of the attributes, if any, lying within the strip imaged by the linescan camera. By imparting a relative motion between the linescan camera and the substrate, the height or depths of the attributes lying on the surface of the substrate can be found, thus allowing a three-dimensional image thereof to be established.

The three-dimensional imaging technique described in my '665 patent, while effective, nonetheless does incur certain disadvantages. In order to obtain the height or depth of the attributes lying in the particular strip of area imaged by the linescan camera, the image of the strip must be successively captured as the line of light is spanned across the substrate. The number of times the camera must successively capture the image of the strip within its field of view is dependent on the width of the band (i.e., the number of strips) spanned by the line of light. The number of strips in the band spanned by the line of light determines the range of height (or depth) that can be measured. To obtain a reasonable range of measurement, a large number of strips must be spanned by the line of light, which, in turn, requires that the linescan camera must successively image the same strip within its field of view a large number of times. Thus, the speed at which a three-dimensional image may be obtained using this technique is limited. Further, to practice this technique, a mechanism is required to repetitively sweep the line of light across the substrate surface.

Thus, there is a need for a technique for achieving a three-dimensional image of a substrate, using a linescan camera, which offers greater speed and requires less hardware than previous techniques.

SUMMARY OF THE INVENTION

Briefly, in accordance with a preferred embodiment of the invention, a method is disclosed for obtaining a three-dimensional image of a substrate in accordance with the gradient of the intensity of the light reflected therefrom. First and second lines of light, each having the same intensity profile, are each directed at the substrate surface at different intervals along a separate one of a pair of paths, each at the same angle, but offset from each other. Each line of light is spanned across the substrate surface to successively illuminate a separate one of a plurality of contiguous strips of area running across the substrate surface. Each successive strip illuminated by the first of light is laterally offset from each successive strip illuminated by the second line of light. As the first and the second lines of light are separately spanned across the substrate, the intensity of light reflected from each of a plurality of strips, each lying between the strips successively illuminated by the first and second lines of light, is sensed. A three-dimensional image can be obtained from a prescribed relationship between the sensed intensity of the reflected light from strips upon illumination by the first and second lines of light.

DETAILED DESCRIPTION

Figure 1:
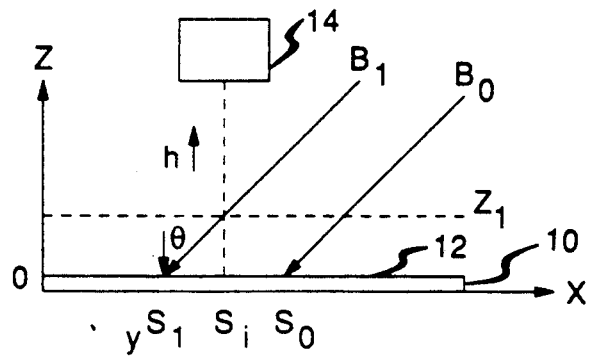
FIG. 1 is a side view of a substrate illuminated with a separate one of a pair of light beams.
Figure 2:
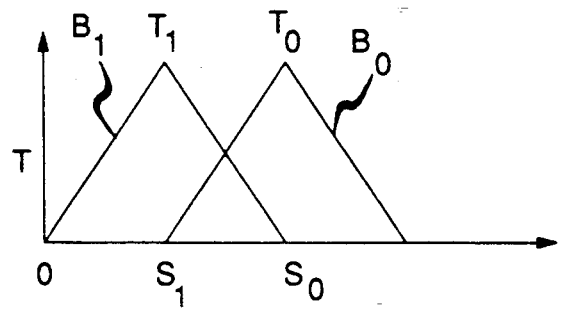
FIG. 2 is an illustrative plot of the intensity profile of each of the two beams of FIG. 1.

Before proceeding to describe the details of the three-dimensional imaging system of the present invention, the basic principle of its operation will be described first. Referring to FIG. 1, there is shown a substrate 10 (i.e., a circuit board) positioned such that its upper major surface 12 lies at the origin of the z axis. On the surface 12 are a pair of spots $S_0$ and $S_1$ which are each illuminated by a separate one of a pair of light beams $B_1$ and $B_0$, each directed at the substrate at an angle $\theta$, and each having the same intensity profile. For purposes of illustration, each of the beams $B_1$ and $B_2$ is assumed to have a linear intensity profile. In other words, the transmission intensity gradients $T_1$ and $T_2$ associated with the beams $B_1$ and $B_2$, respectively, are assumed to fall off linearly from the center of the beam as depicted graphically in FIG. 2. In actuality, the gradients $T_1$ and $T_2$ of the beams $B_1$ and $B_0$, respectively, are not truly linear; however, the error incurred by assuming a linear gradient is small and may be ignored.

Figure 3:
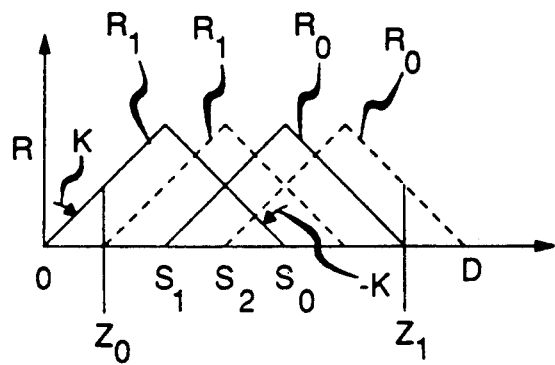
FIG. 3 is an illustrative plot of the intensity of light reflected from a spot on the substrate of FIG. 1 as a function of its distance from the point of incidence of each of the two beams.

As seen in FIG. 1, when a light-sensing device 14 (i.e., a photodetector) is trained normally on a spot $S_i$ on the surface 12, the intensity of the reflected light (R) sensed by the detector will depend on how far the spot is spaced laterally from each of the spots $S_1$ and $S_0$. FIG. 3 shows a plot of the reflectance intensity versus the lateral distance of the spot $S_i$ from each of the spots $S_1$ and $S_0$. The two separate "sawtooth" waveforms in FIG. 3 represent the reflectance intensities $R_1$ and $R_0$ which are attributable to the illumination supplied by a separate one of the beams $B_1$ and $B_2$, respectively. As may be appreciated from FIG. 3, the closer the spot $S_i$ to a separate one of the spots $S_1$ and $S_0$, the greater the individual reflectances $R_1$ and $R_0$, respectively. Conversely, the farther the spot $S_i$ is from a separate one of the spots $S_1$ and $S_0$, the smaller each of the reflectances $R_1$ and $R_0$, respectively. When $S_i$ is located between $S_1$ and $S_0$, as seen in FIG. 1, then, reflectance intensity $R_1$ will increase as $R_0$ decreases and vice versa. The slope of the upwardly rising and downwardly declining portions of each sawtooth waveform in FIG. 3 is $+K$ and $-K$, respectively.

Each of the reflectance intensities $R_1$ and $R_0$ also depends on the distance of the detector from the substrate 12 along the z axis. The solid line sawtooth waveforms in FIG. 3 depict the sensed reflectance intensities $R_1$ and $R_0$, of the beams $B_1$ and $B_0$, respectively, when the detector is located a distance h from the substrate surface 12. If the distance from the detector 12 is $h-Z_1$, then, because the beams $B_1$ and $B_0$ strike the surface at the angle $\theta$, the lateral position of the spots $S_1$ and $S_0$, relative to the spot $S_i$, will be different, causing the measured reflectance intensities to differ. The dashed sawtooth waveforms in FIG. 3 represent the reflectance intensities $R_1$ and $R_0$ versus distance when the substrate surface 12 lies at the point $Z_1$ on the z axis.

As may be appreciated by comparing the dashed waveforms in FIG. 3 to the solid ones, the reflectance intensities $R_1$ and $R_0$ depend on the z position of the substrate surface 12. In accordance with the invention, the actual z position of the substrate surface 12, can be calculated from a knowledge of the reflectance intensity $R_1$ and $R_0$ attributable to the beams $B_1$ and $B_0$, respectively. Assuming that the spot $S_i$ lies between $S_1$ and $S_2$, and that the reflectance intensities $R_1$ and $R_0$ each have linear gradients, then each of the reflectance intensities $R_1$ and $R_0$ lying in the region between $S_0$ and $S_1$, can be expressed mathematically as follows:

$$R_1 = Re(-Kz + a) \tag{1}$$

$$R_0 = Re(Kz + a) \tag{2}$$

where Re is the reflectivity of the surface 12 and a is a constant.

Dividing equation (2) by equation (1) yields the following relationship $$\frac{R_0}{R_1} = \frac{+Kz + a}{-Kz + a} \tag{3}$$

By rearranging the terms, and substituting the quantity C for the expression K/a, the z axis position can be expressed as $$Z = \frac{1}{C} \frac{R_0 - R_1}{R_0 + R_1} + Z_0 \quad (4)$$

where $Z_0$ is the z position of the origin (assumed to be zero).

It is important to note that z axis position given by equation (4) is free of any dependence on the reflectivity of the surface 12 since the angle $\theta$ at which each of the beams $B_1$ and $B_0$ strikes the surface is identical. While equation (4) is predicated on each of the beams $B_1$ and $B_0$ having a linear gradient, the same principle can be applied to find the appropiate relationship between the z axis position and the reflectance intensities $R_1$ and $R_0$ for non-linear gradients.

Figure 4:
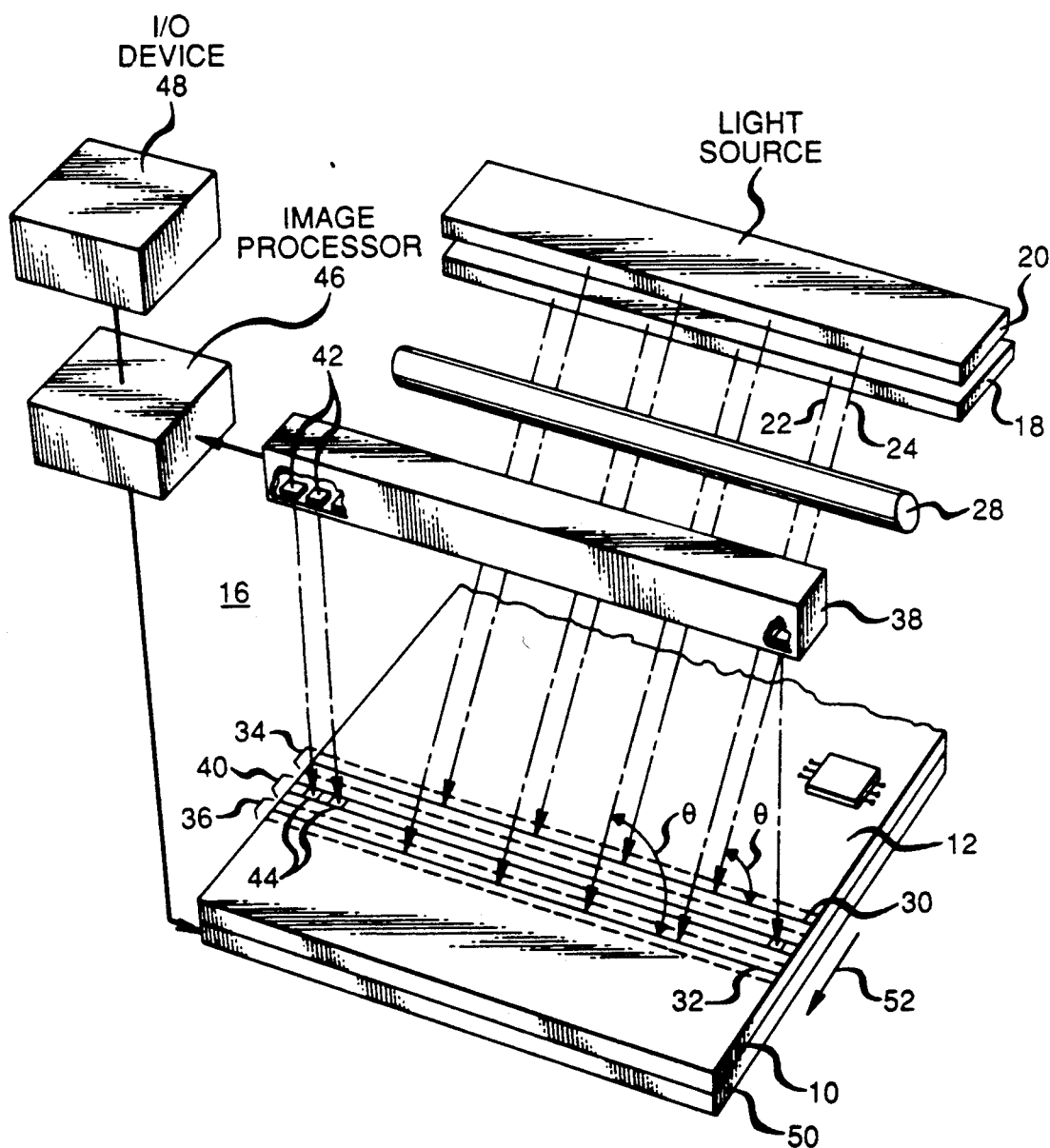
FIG. 4 is a block schematic diagram of a system in accordance with the present invention for obtaining a three-dimensional image of the substrate of FIG. 1.

FIG. 4 illustrates a perspective view of a system 16, in accordance with the invention, for obtaining a three-dimensional image of the substrate 10 of FIG. 1 using the principles described above. In an exemplary embodiment, the substrate 10 takes the form of a circuit board on which one or more components 17 are mounted. The three-dimensional imaging system 16 includes a pair of stationary light sources 18 and 20 which each generate a separate one of beams 22 and 24, respectively, which have identical profiles (gradients). In an exemplary embodiment, each of the light sources 18 and 20 comprises a fiber optic illuminator whose output is supplied to a circle-to-line converter (not shown) which transforms a single light beam into a plurality of beams arranged in a linear array. Instead of a fiber optic illuminator, a laser (not shown) and a mechanism (not shown) for spanning its beam to produce a line of light could also be employed.

The beams 22 and 24 are directed into a cylindrical lens element 28 which transforms the beams incident thereon into a separate one of a pair of lines of light 30 and 32. The lines of light 30 and 32, which are offset from each other in space because the light sources 18 and 20 are themselves offset from each other, are each directed at the substrate 10 at the same angle ($\theta$) so as to illuminate a separate one of a pair of laterally spaced strips 34 and 36 which run along the surface 12 parallel to a first axis 37. In a presently preferred embodiment, the spacing between the strips 34 and 36 is on the order of 1-2 mm, and has been exaggerated for purposes of illustration. The spacing between the lines of light 30 and 32 will depend on the height of the cylindrical lens 28 from the surface 12 and the spacing between the light sources 18 and 20.

An image-acquisition device 38, in the form of a linescan camera, is secured above the substrate 10 so that the camera has its optical axis 39 trained downwardly, normal to the surface 12, to impinge on a strip of area 40 running across the surface so as to lie between the strips 34 and 36. The linescan camera 38 is of a well-known design and comprises a plurality of light-sensing elements (charge-coupled devices) 42, typically 4096 in number, which are arranged in a linear array parallel to the axis 37. The light-sensing elements 42 each serve to sense the light intensity reflected from a separate one of a plurality of small, contiguous regions 44, each typically 50×50 to 75×75 microns in size, which collectively comprise the strip 40. Each region 44 corresponds to a small region, known as a picture element or pixel, within the image of the strip 40 captured by the camera 38.

An image processor 46, identical to that described in U.S. Pat. No. 4,811,410 (herein incorporated by reference) is coupled to the linescan camera 38 and serves to process the output signal of the light-sensing elements 42 to determine the intensity of light reflected from each of the regions 44 in the strip 40. The image processor 46 is coupled to at least one input/output (I/O) device 48, (i.e., a video display terminal, printer or plotter) which serves to display a three-dimensional image of the substrate 10 generated by the image processor in the manner described below.

In addition to processing the output signal of the linescan camera 38, the image processor 46 also has the task of controlling a movable slide 50 on which the substrate 10 is seated. Under control of the image processor 46, the slide moves along an axis 50 perpendicular to the axis 37. In this way, each of the lines of light 30 and 32, which themselves are stationary, can be spanned across the surface 12 to illuminate a successive one of a plurality of contiguous strips of area parallel to the axis 37. In other words, by displacing the slide 50 along the axis 52, the strips 34 and 36 illuminated by the lines of light 30 and 32, respectively, are themselves effectively displaced along the surface 12 of the substrate 10. At the same time, the strip 40, imaged by the linescan camera 38, is also effectively displaced along the surface 12.

To obtain a three-dimensional image of the surface 12 of the substrate 10 using the system 16, one of the light sources 18 and 20 is rendered operative while the other is not. For purposes of discussion, the light source 18 is initially rendered operative, although it need not be. While the light source 18 is operative, the slide 50 is displaced along the axis 52, thereby displacing the substrate 10 relative to line of light 30 so that the line effectively spans the surface 12 to successively illuminate each of a first plurality of contiguous strips of area thereon. During the displacement of the substrate 10 along the axis 52, the strip of area 40 imaged by the linescan camera 38 is effectively displaced across the surface 12. In this way, the linescan camera 38 successively captures the image of each of a second plurality of contiguous strips of area on the surface 12. Each successive one of the second plurality of strips imaged by the camera lies adjacent to each successive one of the first plurality of strips illuminated by the first line of light 30. The image of each successive strip captured by the linescan camera 38 is supplied to the image processor 46 which, in turn, establishes the reflectance intensity of the light reflected from the regions 44 in each successive strip attributable to the successive illumination of the adjacent strip by the line of light 30. Only the reflectance intensity of the regions of interest 44 in each strip (i.e., the regions in which all or part of a component 17 is located) is retained.

After the substrate surface 12 has been spanned by the line of light 30, then the light source 18 is temporarily rendered inoperative and the light source 20 is rendered operative. The slide 50 is now returned to its original position (the origin) and the circuit board 10 is now spanned by the line of light 32. The reason for returning the slide 50 to its original position rather than span the circuit board 10 in the opposite direction is to achieve greater repeatability of the scan. As the slide 50 is displaced again along the axis 52, the linescan camera 38 successively captures the image of each of the second plurality of strips of area on the surface 12. The image of each successive strip captured by the linescan camera 38 is supplied to the image processor 46 which, in turn, establishes the reflectance intensity associated with the regions 44 in each successive strip attributable to the successive illumination of the adjacent strip by the line of light 32. Again, only the reflectance intensity associated with the regions of interest 44 in each strip is retained by the image processor 46.

Once the image processor 46 has established the reflectance intensities of each region of interest 44 attributable to the first and second lines of light 30 and 32, respectively, the height (or depth) of the attributes, if any (e.g., the component 17 or portion thereof), in each region can be established as described earlier. Assuming that each of the lines of light 30 and 32 have linear intensity gradients, the height can be established from equation (4). If the gradients are not linear, a different relationship must be established.

A distinct advantage of the three-dimensional imaging technique of the invention is that of speed. Assuming that the linescan camera 38 contains 4096 light-sensing elements 42, and that the rate at which data can be read therefrom is 10 MHz, then each successive strip of surface area on the surface 12 can be imaged in approximately 0.409 milliseconds. If the strip of area 40 imaged by the camera is assumed to be 75 microns wide, then for a substrate 12 approximately 30 cm. long, approximately 1.6384 seconds is required to obtain the reflectance intensity associated with each of the lines of light 30 and 32. Theoretically, it may be possible to achieve faster image acquisition by using a faster camera 38. Moreover, this technique can be practiced using the same apparatus described in the '410 patent incorporated by reference herein.

The foregoing discloses a technique for obtaining a three dimensional image of the substrate 12 by successively illuminating each of a plurality of strips of area 34,36 with a separate one of a pair of lines of light 30 and 32. The height (or depth) of each attribute in each successively illuminated strip will be given by a prescribed relationship between the reflectance intensity associated with each line of light 30,32.

The three-dimensional imaging technique of the invention can also be practiced by illuminating successive strips of area on the surface 12 with a single line of light 30 and then sensing the light reflected from each of a successive pair of strips spaced from, so as to be on opposite sides of, each successively illuminated strip. To this end, each of a pair of cameras (not shown), identical to the camera 38 of FIG. 1, would be trained on the surface 12 of the circuit board 10 to detect the light reflected from a separate one of a pair of strips on opposite sides of the strip illuminated by the single line of light. The two cameras, as well as the single line of light, would remain stationary while the circuit board 10 was displaced along the axis 52. An advantage to using two cameras, located on opposite sides of a single light source, is that registration problems associated with separately illuminating each of a pair of strips on opposite sides of a single strip imaged by the camera 38 would be eliminated since the circuit board need only be spanned once by both cameras rather than twice. On the other hand, this approach would be much more costly to implement because each camera and its associated electronics typically costs much more than each of the light sources 18 and 20.

While the three-dimensional technique of the invention has been described with respect to imaging the surface 12 of a circuit board 10 using two lines of light 40, it can also be practiced to image surfaces using other forms of electromagnetic radiation. As an example, the present technique could be employed to produce topographical maps of the surface of the earth by using separate radar beams.

It is to be understood that the above-described embodiments are merely illustrative of the principles of the invention. Various modifications and changes may be made thereto by those skilled in the art which will embody the principles of the invention and fall within the spirit and scope thereof.

I claim:

1. A method for obtaining a three-dimensional image of a surface comprising the steps of:

spanning the surface with at least one line of electromagnetic radiation directed at an angle toward the surface to expose successive contiguous strips of area with the radiation;

sensing the radiation reflected from a successive one of a first and second plurality of contiguous strips of area on the surface by spanning the surface with at least one radiation-sensing means moving in unison with the line of electromagnetic radiation, each successive first and second strip spanned by said radiation-sensing means lying on opposite sides of each successive strip exposed to electromagnetic radiation; and establishing a three-dimensional image of the attributes on the surface in accordance with the ratio of the sensed intensity of electromagnetic radiation reflected from successive corresponding pairs of the first and second strips of area.

2. The method according to claim 1 wherein the surface is spanned with a line of light.

3. The method according to claim 1 wherein the three-dimensional image is obtained in accordance with the ratio of the difference between the sensed reflectance intensity of each of the successive corresponding pairs of the first and second strips to their sum.

4. A method for obtaining a three-dimensional image of a substrate comprising the steps of:

separately spanning a substrate with first and second lines of light, each having a known intensity profile, and each directed at the substrate along a separate one of the first and second paths, respectively, each at the same angle with the substrate surface as the other but being offset from one another so that each of the lines of light illuminates a successive one of a first and a second plurality of contiguous thin strips of area running across the substrate surface;

sensing the intensity of light reflected from a successive one of a third plurality of strips of area when each of the first and the second plurality of strips is separately illuminated by the first and second lines of light, respectively, by spanning the substrate with a linescan camera moving in unison with each line of light; and establishing a three-dimensional image of each attribute (if any) in each of the third plurality of strips in accordance with the ratio of the intensity of the light reflected from each of the third plurality of strips when each of the first and second plurality of strips of area is separately illuminated by the first line of light to the intensity sensed when illuminated by the second line of light, respectively.

5. The method according to claim 4 wherein each successive one of the third plurality of strips lies between each successive one of the first and second plurality of strips.

6. The method according to claim 4 wherein the step of successively spanning the substrate with each of the first and the second lines of light comprises the steps of:
   directing the first and the second lines of light at the substrate along the first and second paths at separate intervals to illuminate first and second spaced strips on the substrate surface; while
   displacing the substrate relative to each respective line of light.

7. The method according to claim 6 wherein the step of sensing the light reflected from each strip comprises the steps of:
   training a linescan camera onto the substrate to capture the image of each successive strip lying between the successive strips illuminated by the first and the second lines of light.

8. A method for obtaining a three-dimensional image of a substrate comprising the steps of:
   directing a first line of light at a substrate at an angle along a first path to illuminate a first strip of area running thereacross;
   sensing the intensity of the light reflected from the substrate from a second strip which is adjacent to the first strip;
   displacing the substrate in a first direction so that the first line of light successively illuminates each of a first plurality of contiguous strips of surface area while the intensity of light reflected from each of a second plurality of contiguous strips, each adjacent to a successive one of the first plurality of strips, is sensed;
   directing a second line of light at the substrate along a second path at the same angle as the first path, but offset therefrom, to illuminate a third strip of area running across the substrate surface and lying adjacent to the second strip;
   sensing the intensity of the light reflected from the second strip while only the third strip is illuminated;
   displacing the substrate in a direction opposite to the first direction so that the second line of light successively illuminates each of a third plurality of strips of area while the intensity of light reflected from each of the second intensity of strips is sensed; and
   establishing the height of each attribute in each of the second plurality of strips in accordance with the ratio of the intensity of light sensed when the substrate is illuminated by the first line of light to the intensity sensed when illuminated by the second line of light.

9. Apparatus for establishing a three-dimensional image of a substrate comprising:
   first illuminating means for directing a first line of light at a substrate at an angle along a first path to illuminate a first strip of area running across the substrate surface;
   second illuminating means for directing a second line of light at the substrate along a second path, at the same angle as, but offset from, the first path to illuminate a second strip of are on the substrate surface;
   an image-acquisition device trained on the substrate surface to detect the intensity of the light reflected from a third strip of area adjacent to the first and second strips illuminated by a respective one of the first and the second lines of light;
   image processing means coupled to the image-acquisition means for processing the output signal thereof to establish a three-dimensional image of the attributes (if any) in the strip imaged by the camera in accordance with the ratio of the intensity of the light reflected from the substrate upon illumination by the first line of light to the intensity sensed when illuminated by the second line of light; and
   means for imparting a relative motion between the substrate and the combination of the image-acquisition means and the first and the second illuminating means to enable the image processing means to establish a three-dimensional image of the entire substrate.

10. The apparatus according to claim 9 wherein the image-acquisition means comprises a linescan camera.

11. The apparatus according to claim 9 wherein each of the first and second illumination means individually comprises:
   means for producing a beam of light; and
   a cylindrical focusing element for focusing the beam of light into a line of light.

12. The invention according to claim 9 wherein the means for imparting a relative motion comprises a movable slide for supporting the substrate.

* * * * *